No. 893,127. PATENTED JULY 14, 1908.
G. M. BARBER.
STEAM TURBINE.
APPLICATION FILED JULY 5, 1907.
2 SHEETS—SHEET 1.
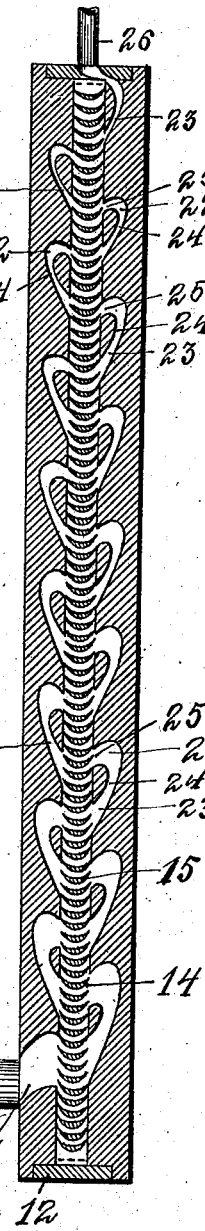
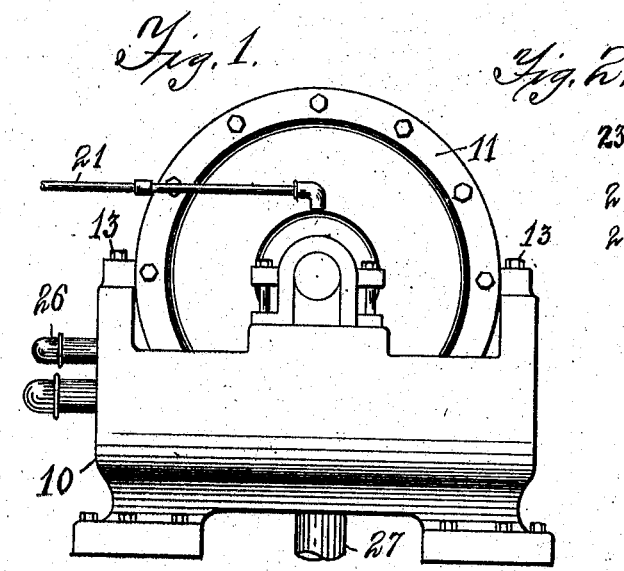
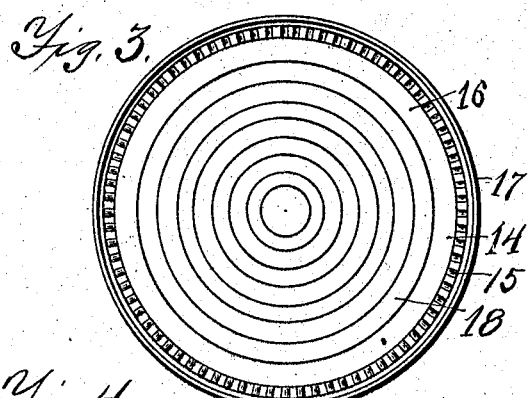
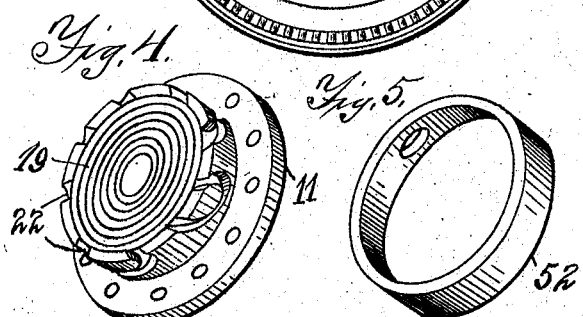
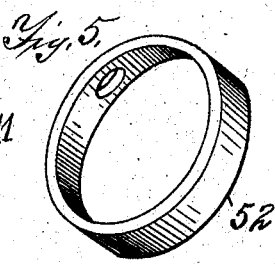
Witnesses
J. A. Ellsworth
A. W. Kettle
Inventor
Guy M. Barber
By S. Arthur Baldwin
Attorney

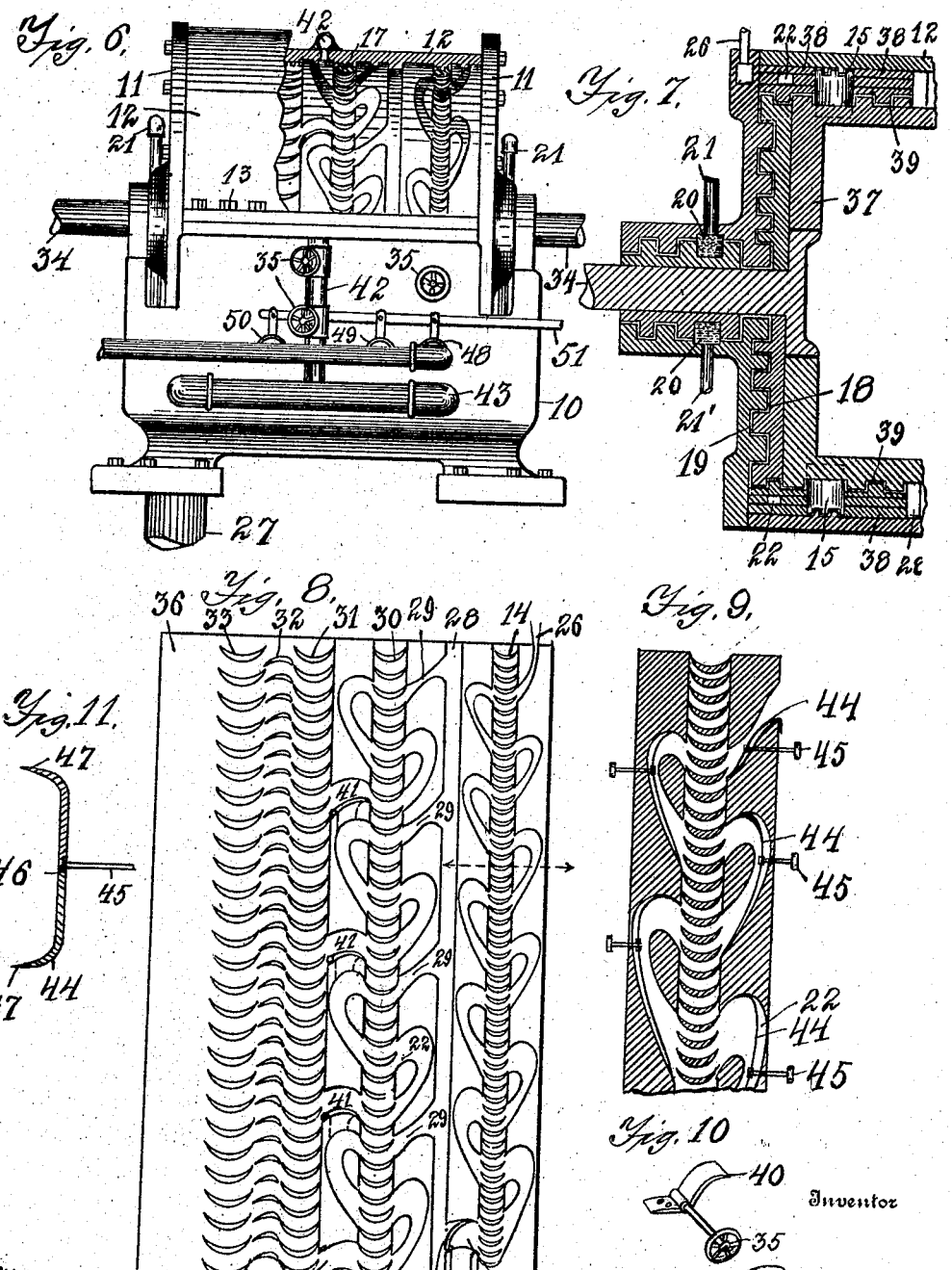

UNITED STATES PATENT OFFICE.

GUY M. BARBER, OF FALCONER, NEW YORK.

STEAM-TURBINE.

No. 893,127.   Specification of Letters Patent.   Patented July 14, 1908.

Application filed July 5, 1907. Serial No. 382,141.

*To all whom it may concern:*

Be it known that I, GUY M. BARBER, a citizen of the United States, residing at Falconer, in the county of Chautauqua and State of New York, have invented new and useful Improvements in Steam-Turbines, of which the following, taken in connection with the accompanying drawings, is a full, clear, and exact description.

The invention relates to rotary engines of the impact type driven by steam or other expansible motive fluid; and the objects of my improvement are, first, to provide a simple turbine wheel structure of the vane type having a series of side passages or by-paths circumferentially placed on each side of the vanes of the turbine wheels, by means of which the expansible motive fluid is caused to pass and repass with renewed impact upon and through the vanes, until entirely exhausted or reduced to atmospheric pressure; second, to so arrange said side passages as to adjustably control their size, said side passages being preferably arranged in an enlarging series and with contraction in each nozzle so as to give renewed velocity to the motive fluid; third, to so arrange said side passages and vanes that a number of units may be placed side by side and made into a large engine with increased openings or admissions and exits for the expansible motive fluid; and fourth, to provide means in said extended unit for cutting off a portion of the units and thereby reduce the power and the expense of running the same to the minimum.

In the drawings Figure 1 is an end elevation of my engine. Fig. 2 is a sectional diagrammatic view of the turbine and the engine heads on a circumferential line through the vanes and by-paths. Fig. 3 is a side elevation of the turbine wheel. Fig. 4 is a perspective view of one of the engine heads showing the by-paths; and Fig. 5 is a ring fitted on to said engine head to close said by-paths. Fig. 6 is a side elevation of the engine, the upper portion broken away showing a number of units side by side. Fig. 7 is a vertical sectional view of the engine and cylinder showing the "labyrinth" packing for the same. Fig. 8 is a sectional diagrammatical circumferential view showing my arrangement of a series of units for an engine of a large type. Fig. 9 is a sectional diagrammatic view of the by-paths and vanes showing the adjustable springs for controlling the size and shape of said by-paths. Fig. 10 is a detail of one of the valves for closing the exit passage from one unit to another. Fig. 11 is a detail cross sectional view of one of said adjustable springs.

Similar numerals refer to corresponding parts in the several views.

The numeral 10 indicates the supporting base for the turbine case which may be made in any suitable form. The casing consists of the base 10, two heads 11 and the cylinder 12, which cylinder is preferably made in two parts and united at each side by suitable screw bolts 13 in projecting flanges so that the upper half may be removed for placing the turbine cylinders or repairing the same. The cylinder case is preferably made in this form, whether for a large or small type of engine.

Engines of low power, as for example, the single unit type consist of the turbine wheel 14 which has a row of crescent shaped buckets or vanes 15 around the outer periphery of the disk or wheel 16, and the outer ends or periphery of the vanes 15 are closed by a band 17. The vanes 15 are crescent shaped and curved crosswise with their sharp edges toward each lateral side and no live steam is allowed to pass between the edges of the vanes and the head in the closed parts each side of the by-path openings, or parallel with the turbine wheel at each side. The sides of the disk 16 are arranged with tongues and grooves 18 in radiating circles which fit into like tongues and grooves 19 in the engine heads 11 and thereby form a "labyrinth" packing and prevent the escape of the motive fluid. Said labyrinth packing extends also out through the hub and to perfectly seal this joint a water chamber 20 is placed in said joint in the hub and a supply pipe 21 is provided for said chamber at each side, as shown in Fig. 6. A suction pipe 21 is provided on the under side of said chamber 20 which is connected with the vacuum chamber.

The engine heads 11 are each provided with a projecting flange having holes for screw bolts for attaching to the cylinder 12. The head 11 has a central projection on its inner side which extends within the cylinder 12. Circumferentially in line at each side with the vanes 15 are arranged a series of passages or by-paths 22. By-paths 22 are arranged in the single unit type as shown in the diagram in Fig. 2 so that they begin small and gradually enlarge to provide for the expansion of the motive fluid. The nozzle portion 23 of the passage 22 is formed with a contracted portion 24 to choke the motive fluid and give it velocity. Nozzle 23 is inclined at such an angle to the vanes 15 as to throw the motive fluid into the hollow or cupping side of the vanes so that the vanes receive the full force of the motive fluid.

Immediately across the vanes from the mouth of nozzle 23 is an enlargement 25 of the by-path which bends backwardly so that the motive fluid as it comes from the opposite side of the bucket will not splash but will be gathered and forced into the contracted portion to give the fluid greater velocity to again deliver its momentum to the vanes. This arrangement of the semi-circular by-paths 22 on each side of the turbine 14 in alternate relation forms a continuous and enlarging passage in a single unit from the intake tube 26 to the exhaust tube 27, the motive fluid crossing the path of the turbine vanes and passing through the same any number of times desired to exhaust its expansive force. Thus in the diagram shown in Fig. 2 the motive fluid would pass through the vanes 15 seventeen times, each time giving to the turbine wheel added momentum. The ideal in a single unit type is to give a sufficient number of crossings to exhaust the expansive power of the motive fluid or reduce it to atmospheric pressure.

Engines of greater power or larger types are easily arranged by adding a number of units, as shown in Figs. 6, 7, and 8. It is apparent that any number of units may be added to thoroughly exhaust the motive force of the fluid and that all said force is conserved for duty. It is preferred in units of higher power to arrange the first unit with a complete cycle or a semi-cycle of continuous by-paths for the steam. That is, the steam may pass entirely around as shown in the diagram in Fig. 2 and then passing out into a chamber 28 whence it passes through a series of admission nozzles 29 whence it crosses the path of the second turbine wheel 30 through vanes 15, the same as in turbine wheel 14. On account of the expanding or weakening power of the steam it is preferably admitted to the vanes of the second turbine 30 only a limited number of times and thence passes directly into another wheel 31. On the opposite side of wheel 31, the stationary guide vanes 32 are provided which guide the rapidly expanding steam to the vanes of the turbine 33, and thence passes into the vacuum chamber 36 in the end of the cylinder or casing.

Each of the turbine wheels is provided with a band 17 which incloses the vanes 15 and the outer periphery of the band is cut in an alternate tongue and groove labyrinth packing so that one or more units may be added from time to time as greater power is desired and each turbine will shut the motive fluid or steam from the remainder of the cylinder.

It is preferably in units of large type to make them in the form of a cylinder or drum 37, with a central shaft 34 at each end, as shown in Fig. 6 and in section in Fig. 7. The vanes 15 are attached around the outer surface of the cylinder in annular rows as needed. The by-path rings 38 are bolted to the casing 12 each side of the vanes 15; the joint 39 between the by-path rings 38 and cylinder 37 is guarded by means of suitable labyrinth packing so that the motive fluid is forced through the by-paths and vanes and cannot leak.

Curved leaf valves 40 are provided in the exits 41 from each unit in order that they may be closed when it is desired to reduce the power and thereby turn the motive fluid in to the port 42 which is connected with the vacuum chamber 36 through pipe 43. It is thus apparent that only the first unit is in operation in the diagram shown in Fig. 8, since the valve 40 to the first exit is closed.

The size of the nozzles and by-paths 22 may be controlled by leaf springs 44. Springs 44 are attached at their upper ends on the outer curve of the by-paths. Set screws 45 are attached to springs 44 in order to adjust the same and the size of the by-path 22. Springs 44 are preferably made in two parts with a central lengthwise lap 46. The sides 47 are extended up at each side so that the pressure of the expansible motive fluid on the inner side causes the sides 47 to press apart and fill the space steam tight.

The purposes of the by-paths 22 and their contracted nozzle portion 23 is, as stated, to give the slight added momentum for each impact on the vanes 15. The steam is admitted through intake pipe 26 and valves 48, 49, and 50. The first valve 48 admits the motive fluid to the first unit. The second valve 49 admits additional steam or motive fluid to the chamber 28 and the third valve 50 admits to the turbine wheel 31. These intake valves are operated by a rod 51 which extends to a suitable governor. The governor is so arranged that the first supply valve 48 for the first unit is open. Then as soon as the said first unit is fully supplied with steam the second supply valve 49 opens sufficiently to supply any deficiency in steam from the supply of the first valve to carry the load. In the same manner the third supply valve 50 may be opened by the governor under the strain of an exceedingly heavy load.

The construction of the different parts is simple. The vanes 15 are set into the wheel 16. The by-paths 22 are milled from a suitable ring which is shrunk upon the central inner projection of head 11 and the ports are closed on their outer sides by a ring 52 as shown in Fig. 5, which is shrunk over the same. The by-path rings 38 for engines of a large type as shown in section in Fig. 7 are built up in a similar manner. The leaf valve 40 is curved so as to give no sharp turns for the motive fluid. The valve portion is attached to a stem to be turned by a suitable hand wheel as shown, the inner portion being pivotally attached in the exit 41. The port 42 for those units having a number of exits, as shown in the second unit in the diagram in Fig. 8 extend around the cylinder having openings thereto, as shown in section in Fig. 6, the valves 40 being placed at each side of the exits as required. These openings to ports 42 are shown in dotted line in the diagram in Fig. 8 since they turn outwardly just below the mouth of the valve.

It is apparent that my sidewise arrangement of the by-paths admits the steam through the sides of the vanes in the turbine wheels, permitting the admission of the motive fluid at one end of the cylinder and allowing its progress horizontally or in enlarging or diminishing diameter as may be desired through the turbine.

I claim as new:—

1. In a rotary engine, a casing having a central chamber, a turbine wheel rotatably mounted in said chamber, a nozzle for the motive fluid in said casing, an adjustable leaf spring within the opening in said nozzle, said leaf spring formed in two parts with a central lengthwise lap and angular sides, and a set screw to adjust said leaf spring to increase or diminish the size of said opening.

2. In a rotary engine, a casing having a central chamber, a turbine wheel rotatably mounted in said chamber having curved openings therethrough, said casing having alternating curved channels on opposite sides of said curved openings, leaf springs within said curved channels to control the size of the same, and set screws attached to said springs to adjust the same, substantially as and for the purpose specified.

3. In a rotary engine, a casing having a central chamber, a turbine wheel rotatably mounted in said chamber having curved openings therethrough to form buckets, said casing having a series of nozzles on opposite sides of said curved openings, leaf springs within said nozzles having a central sidewise adjustment to fill the space, and set screws attached to said leaf springs to adjust the same within said nozzles, substantially as and for the purpose specified.

4. In a rotary engine, a casing having a central chamber, a turbine wheel rotatably mounted in said chamber, annular rows of crescent shaped vanes around said wheel, said casing having curved bypaths on alternately opposite sides of said vanes to give a recurring impact to the motive fluid, and shutoff valves in the exhaust ports between said annular rows of vanes, substantially as and for the purpose specified.

5. In a rotary engine, a casing having a plurality of series of annular curved by-paths, a shaft extending through said casing, a plurality of annular series of vanes on said shaft alternating said series of curved by-paths, and shut-off valves in the connecting ports between said annular series.

6. In a rotary engine, the combination of a casing having a first annular series of curved by-paths and a series of feed passages alternating said by-paths, said casing having a second series of by-paths and a series of exhaust passages alternating said second series of by-paths, an annular series of crescent shaped vanes rotatably mounted between said first and second series of by-paths, and a second series of crescent shaped vanes rotatably mounted alongside of said second series of by-paths and passages.

7. In a rotary engine, a casing having a plurality of annular series of curved by-paths alternated by crosswise passages, an annular series of crescent shaped vanes rotatably mounted between said series of by-paths and passages, and a plurality of alternating series of rotatable and fixed crescent shaped vanes adjacent to said series of by-paths and cross passages, substantially as and for the purpose specified.

8. In a rotary engine, a casing composed of the cylinder 12 and heads 11, a shaft 34 revolubly mounted in said casing, a drum 37 attached to said shaft within said casing, annular series 14 30 31 and 33 of crescent shaped vanes around said drum, said casing having an annular series of curved by-paths 23 on opposite sides of said vanes to cross and recross the same, said casing having connecting passages or nozzles 28 29 and 41 for said series, shut-off valves 40 in passages 41, a series of crescent shaped vanes 32 between series 31 and 33, said casing having a vacuum 36 in one end beyond said vanes, substantially as and for the purpose specified.

In testimony whereof I have signed my name to this specification in the presence of two subscribing witnesses.

GUY M. BARBER.

Witnesses:
A. W. KETTLE,
I. A. ELLSWORTH